ETIENNE BOILEAU.

Improvement in Fire-plates for Stoves.

4,501. Reissued August 8, 1871.

ATTEST
Geo. L. Ewing
Walter Allen

INVENTOR,
Etienne Boileau
By Knight Bros. Attys.

AM. PHOTO-LITHOGRAPHIC CO. N.Y. (OSBORNE'S PROCESS.)

UNITED STATES PATENT OFFICE.

ETIENNE BOILEAU, OF ST. LOUIS, MISSOURI.

IMPROVEMENT IN FIRE-PLATES FOR STOVES.

Specification forming part of Letters Patent No. 92,253, dated July 6, 1869; reissue No. 4,501, dated August 8, 1871.

*To all whom it may concern:*

Be it known that I, ETIENNE BOILEAU, of the city and county of St. Louis and State of Missouri, have invented certain new and useful Improvements in Fire-Plates for Stoves, &c.; and I do hereby declare that the following is a full, clear, and exact description of the same, reference being had to the accompanying drawing making part of this specification.

Figure 1:
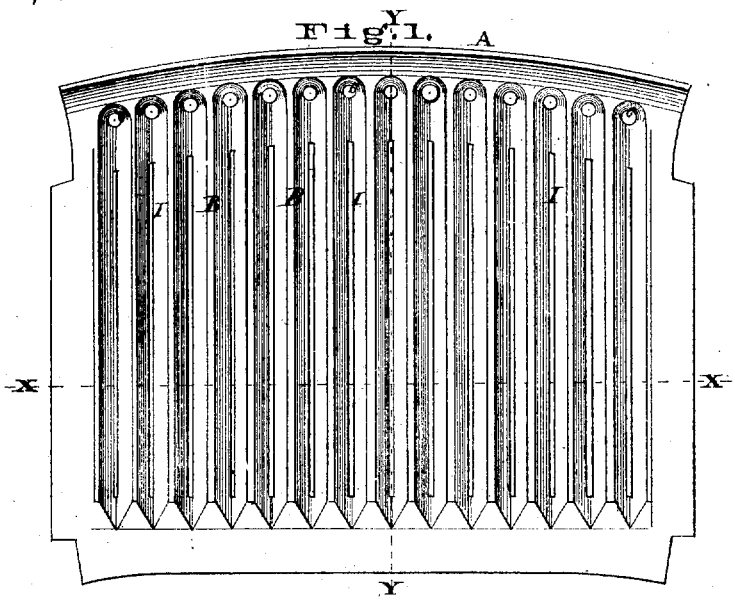
Figure 4:
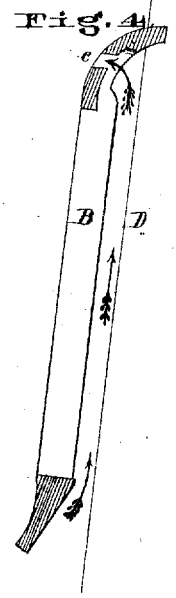
Figure 2:
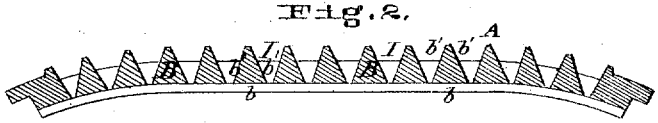
Figure 3:
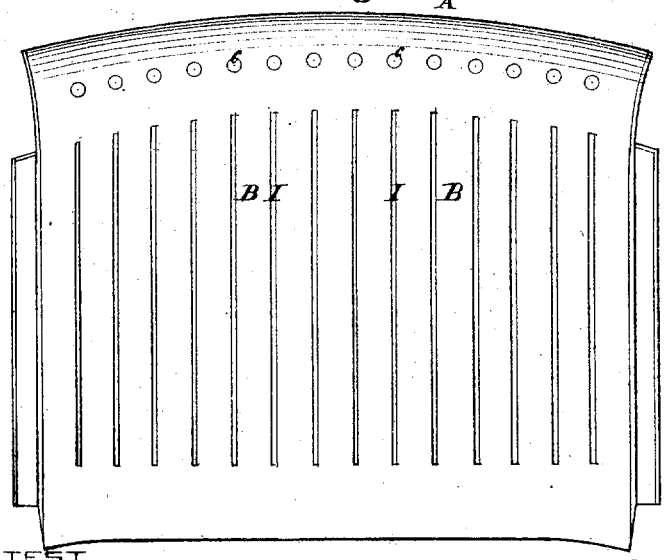

Figure 1 is a rear elevation of my improved fire-plate. Fig. 2 is a transverse section of the same at the line *x x*, Fig. 1. Fig. 3 is a front elevation of the fire-plate. Fig. 4 is a vertical section at the line *y y*, Fig. 1.

In the use of the cast-iron back-plates for the fire-boxes of stoves for burning coal much difficulty has been experienced in insuring either stability or durability, as the intense heat, being applied to but one side of the said plate, would, in a very short time, warp it out of shape and render it useless; or, if still retained in the stove, said heat would "burn out" and destroy the plate, rendering it necessary that the same should be frequently renewed at considerable expense.

To obviate these objections and furnish a sufficient supply of air to the fuel-chamber above the fuel to consume the gas is the object of my invention; which consists in constructing said back-plates of a series of bars triangular in cross-section and joined together at their upper and lower ends, and so proportioned as that the base of said triangle, which is placed next to the fire, shall not exceed one-third the sum of its sides, by which means the action of the cool air at the rear of said bars or plate entirely counteracts that of the fire in front, and not only prevents warping of said plate, but also prevents overheating. It further consists in the employment of the V-shaped grooves between the bars on the rear of said plate for the passage of air to the upper edge thereof, from whence it escapes into the fuel-chamber through suitable openings, and assists in consuming the escaping products of combustion.

A represents the fire-back or fire-plate, consisting principally of a series of bars, B B, &c., placed in an upwardly-inclined or vertical position, with their ends joined to and forming a part of the upper and lower portions of said plate. Transversely the bars are triangular with the base *b* thereof at the front, said base having an area of not more than one-third of that of the two sides *b'* jointly, so that of the total area of said bars not over one-fourth is exposed to the direct action of the fire, while the remaining three-fourths is in direct contact with the cooling air, which is allowed to circulate freely in rear of the back-plate. The contiguous edges of the bars should be as close to each other as it is feasible to cast them, being separated by a narrow slot, I—say, one-sixteenth of an inch wide in front. The object of the slot between the bars is to permit of their expansion and contraction laterally and not to allow the passage of the air in any great quantity through the slots directly into the fire.

In applying my improvement to a stove the back-plate is placed at a suitable distance in front of the front oven-plate D so as to leave between said plates an air-space, E, opening into the ash-pit at bottom, by means of which cold air is brought into contact with the rear of said back-plate and effectually counteracts the effect of heat upon its front. In order that the air thus introduced in rear of the back-plate may be continually renewed so as to be cool, and, at the same time, may assist in consuming the gas arising from the burning coal, the V-shaped grooves between the bars are extended upward, and are each connected with an opening, *c*, which passes through the plates to the front, near its upper edge. The air, entering the space E from beneath the grate, passes upward and escapes through the openings *c c*, &c., into the fuel-chamber, where it meets the ascending current of heated gas at nearly a right angle, by which means said air and gas are so thoroughly united as to insure the perfect combustion of the latter, and, consequently, a large increase in the amount of heat obtained from a given quantity of fuel.

It is believed that this back-plate is almost, if not entirely, indestructible by use in ordinary cooking or heating-stoves, and that, from its many advantages, its general use is certain.

I claim as my invention—

1. A fire-plate, consisting of triangular bars B joined together at their upper and lower ends and separated by narrow slots I, all substantially as set forth.

2. In combination with the V-shaped slots I, the opening *c* at the upper part of the fire-plate, as and for the purpose set forth.

In testimony of which invention I have hereunto set my hand.

ETIENNE BOILEAU.

Witnesses:

SAML. KNIGHT,

R. T. BRADLEY.